US008621189B2

(12) United States Patent
Lambert et al.

(10) Patent No.: US 8,621,189 B2
(45) Date of Patent: Dec. 31, 2013

(54) SYSTEM AND METHOD FOR HARDWARE STRENGTHENED PASSWORDS

(75) Inventors: Robert John Lambert, Cambridge (CA); Christopher Lyle Bender, Waterloo (CA)

(73) Assignees: BlackBerry Limited, Waterloo, Ontario (CA); Certicom Corp., Mississauga, Ontario (CA)

( * ) Notice: Subject to any disclaimer, the term of this patent is extended or adjusted under 35 U.S.C. 154(b) by 220 days.

(21) Appl. No.: 12/974,051

(22) Filed: Dec. 21, 2010

(65) Prior Publication Data

US 2012/0155637 A1    Jun. 21, 2012

(51) Int. Cl.
*G06F 21/00* (2013.01)
(52) U.S. Cl.
USPC .......................................................... 713/1
(58) Field of Classification Search
USPC .................................. 380/4; 386/235; 713/1
See application file for complete search history.

(56) References Cited

U.S. PATENT DOCUMENTS

| 7,894,606 B2 * | 2/2011 | Eastham ...................... 380/278 |
| 2006/0156026 A1 * | 7/2006 | Utin .............................. 713/183 |
| 2008/0040613 A1 * | 2/2008 | Challener ..................... 713/185 |
| 2009/0110191 A1 | 4/2009 | Sanvido |
| 2010/0104102 A1 * | 4/2010 | Brown et al. ................. 380/277 |
| 2010/0208888 A1 | 8/2010 | Weber |

FOREIGN PATENT DOCUMENTS

EP           1615099 A2    5/2005

* cited by examiner

*Primary Examiner* — Brandon Hoffman
*Assistant Examiner* — Anthony Brown
(74) *Attorney, Agent, or Firm* — Jenna L. Wilson; Dimock Stratton LLP

(57) ABSTRACT

A cryptographic module and a computing device implemented method for securing data using a cryptographic module is provided. The cryptographic module may include an input component for receiving a password, an output component for outputting data to the computing device, a random number generator for generating a random number and a module processor operative to generate at least one cryptographic key using the generated random number, and to record an association between the received password linking the received password with the at least one cryptographic key in a data store accessible to the cryptographic module.

19 Claims, 5 Drawing Sheets

SYSTEM AND METHOD FOR HARDWARE STRENGTHENED PASSWORDS

TECHNICAL FIELD

This application relates to computing device security. More particularly, it relates to encrypting and decrypting data on a computing device.

BACKGROUND

Cryptographic keys are used to encrypt data using an encryption algorithm in a way that makes it difficult for an unauthorized person to decrypt the data without the corresponding decryption key. Once generated, it is generally important to maintain a cryptographic key in a secure manner so that an unauthorized person is unable to obtain or access the key.

There is a need for a computing device that can generate cryptographic keys or encrypt/decrypt data in an efficient and secure manner.

BRIEF DESCRIPTION OF THE DRAWINGS

In drawings which illustrate, by way of example only, embodiments of the present application.

DETAILED DESCRIPTION

Figure 1:
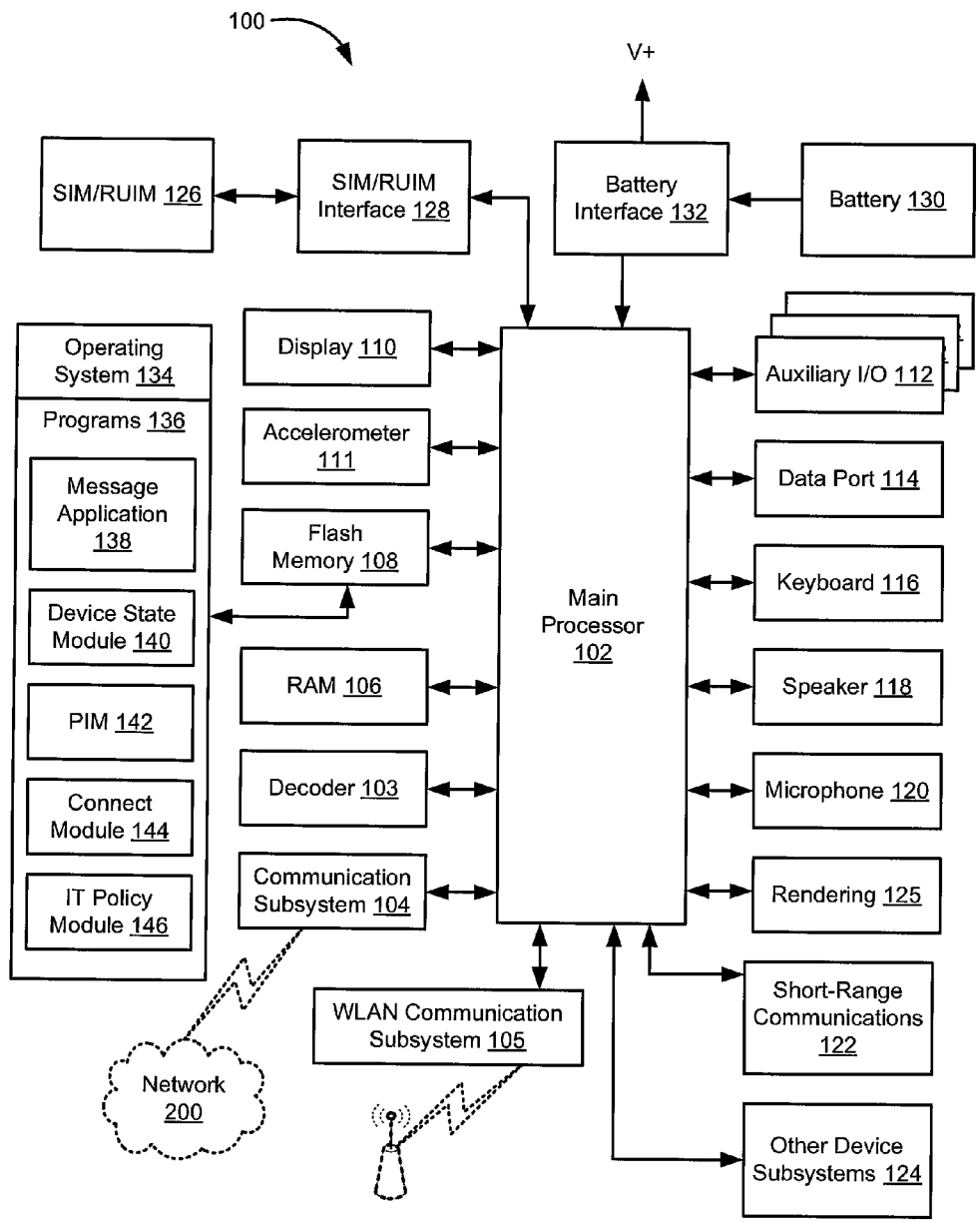
FIG. 1 is a block diagram of an embodiment of a mobile device.

In an embodiment, a cryptographic module is provided for generating and storing encryption keys. Upon receiving a password from a user, the hardware module may generate at least one cryptographic key by using a random number generated by the cryptographic module. In an aspect, the cryptographic module may combine the received password with the random number to generate the at least one cryptographic key. An association between the received password and the at least one cryptographic key may be stored within a data store accessible to the cryptographic module. The recorded association allows the cryptographic module to recall a previously generated cryptographic key the next time the associated password is input into the cryptographic module.

In an embodiment, a computing device implemented method is provided for using a cryptographic module located within the computing device, the method comprising the cryptographic module: receiving a password; checking a data store for one or more cryptographic keys associated with the received password; if the data store contains one or more cryptographic keys associated with the received password, retrieving at least one of the one or more cryptographic keys; or, if the data store does not contain one or more cryptographic keys associated with the password, generating a random number using a random number generator; generating at least one cryptographic key using the generated random number; and, recording an association of the received password and the at least one cryptographic key in the data store.

In an aspect of the method, the generating at least one cryptographic key may further comprise combining the generated random number with the received password as inputs to a cryptographic key generation operation to form the at least one cryptographic key.

In an aspect of the method, after generating the at least one cryptographic key, the method may further comprise outputting the at least one cryptographic key to a component of the computing device.

In an aspect the method may further comprise the cryptographic module receiving a cryptographic state identifier with the received password, and after the cryptographic module generates the at least one cryptographic key, the method further comprises the cryptographic module, entering a cryptographic state defined by the cryptographic state identifier and the at least one cryptographic key, and while the cryptographic module is in the cryptographic state, the cryptographic module operative to receive data to be processed from a component of the computing device; process the received data in accordance with the entered cryptographic state using the at least one cryptographic key; and, output the processed data; whereby the cryptographic module is operative to continue processing data in accordance with the entered cryptographic state until an updated cryptographic state identifier and password is received from the computing device.

In an aspect of the method, the cryptographic module may be further operative to receive a kill command from the computing device and, in response to the kill command, the method may further comprise deleting the recorded association of the received password and the at least one cryptographic key from the data store.

In an aspect of the method, the cryptographic module may be further operative to detect an improper data access attempt by the cryptographic module: receiving at least one password that is not recorded in the data store and the accompanying cryptographic state identifier comprises a decryption state identifier, and upon detecting the improper data access attempt, the method may further comprise the cryptographic module deleting at least one of the recorded associations from the data store.

In an embodiment, a cryptographic module for a computing device is provided, the cryptographic module comprising: an input component for receiving a password; an output component for outputting data to the computing device; a random number generator for generating a random number; a module processor operative to generate at least one cryptographic key using the generated random number, and to record an association between the received password linking the received password with the at least one cryptographic key in a data store accessible to the cryptographic module; wherein the cryptographic module is operative upon receiving the received password to access the data store to determine if an association for the received password is recorded, and if the association is recorded, the cryptographic module is operative to retrieve at least one cryptographic key from the association, and if the association is not recorded, the cryptographic module is operative to generate at least one cryptographic key using the generated random number and to record an association between the received password and the at least one cryptographic key in the data store.

In an aspect, the cryptographic module may be further operative to generate the at least one cryptographic key by combining the generated random number with the received password as inputs to a cryptographic key generation operation to form the at least one cryptographic key.

In an aspect, the cryptographic module may be further operative to output the at least one cryptographic key using the output component to a component of the computing device.

In an aspect, the cryptographic module may be further operative to receive a cryptographic state identifier with the received password, and the cryptographic module is operative to enter a cryptographic state defined by the cryptographic state identifier and the at least one cryptographic key, and while the cryptographic module is in the cryptographic state, the cryptographic module operative to receive data to be processed from a component of the computing device; process the received data in accordance with the entered cryptographic state using the at least one cryptographic key; and, output the processed data; whereby the cryptographic module is operative to continue processing data in accordance with the entered cryptographic state until an updated cryptographic state identifier and password is received from the computing device.

In an aspect, the cryptographic module may be further operative to receive a kill command from the computing device and, in response to the kill command, the cryptographic module is operative to delete the recorded association of the received password and the at least one cryptographic key from the data store.

In an aspect, the cryptographic module may be further operative to detect an improper data access attempt when the cryptographic module receives at least one password that is not recorded in the data store and the accompanying cryptographic state identifier comprises a decryption state, and when the cryptographic module detects the improper data access attempt, the cryptographic module is operative to delete at least one recorded association from the data store.

In an aspect, the at least one cryptographic key may be generated by combining the generated random number with the received password using an XOR operation.

In an aspect, the at least one cryptographic key may be generated by: deriving an elliptic curve value from the received password; performing an elliptic curve scalar multiplication using the elliptic curve value and the generated random number; and, applying a deterministic key-derivation function to the product of the elliptic curve scalar multiplication. In an aspect, the result of the deterministic key-derivation function may be combined with the generated random number using an XOR operation.

Figure 2:
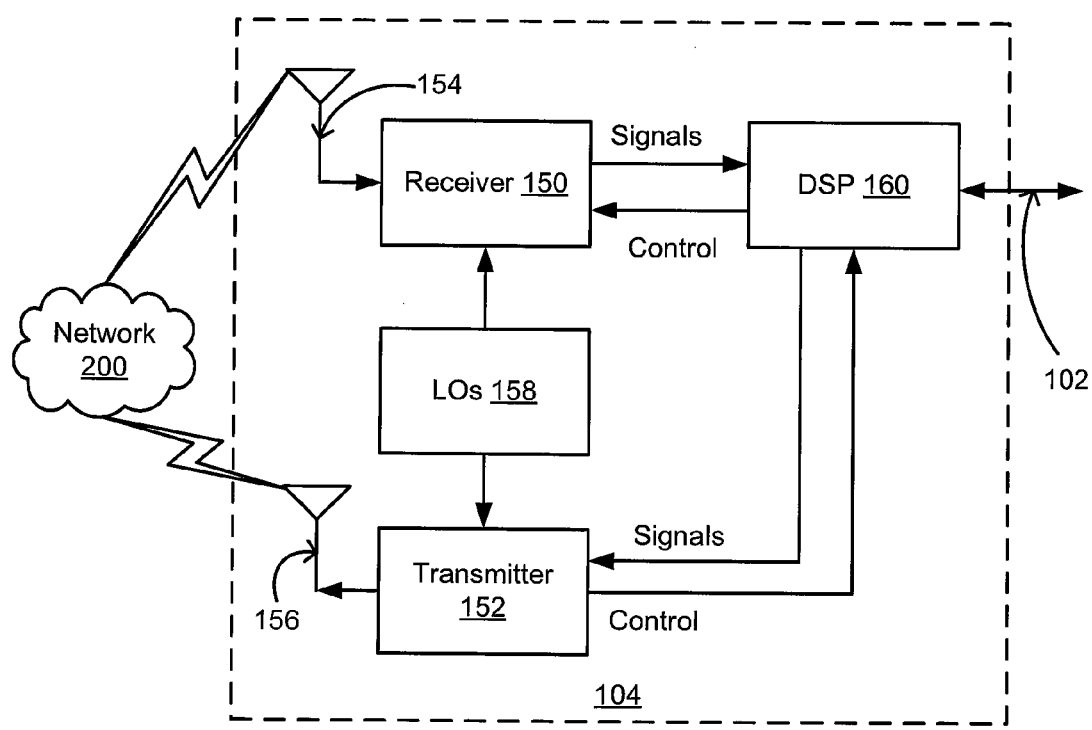
FIG. 2 is a block diagram of an embodiment of a communication subsystem component of the mobile device of FIG. 1.

The embodiments described herein may be implemented on a communication device such as that illustrated in FIGS. 1 and 2. The communication device 100 may be a mobile device with two-way communication and advanced data communication capabilities including the capability to communicate with other mobile devices or computer systems through a network of transceiver stations. The communication device 100 can also have voice communication capabilities.

FIG. 1 is a block diagram of an exemplary embodiment of a communication device 100. The communication device 100 includes a number of components such as a main processor 102 that controls the overall operation of the communication device 100. Communication functions, including data and voice communications, are performed through a communication subsystem 104. Data received by the communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The mobile device 100 may be provided with additional communication subsystems, such as the wireless LAN (WLAN) communication subsystem 105 also shown in FIG. 1. The WLAN communication subsystem may operate in accordance with a known network protocol such as one or more of the 802.11™ family of standards developed by IEEE. The communication subsystem 105 may be separate from, or integrated with, the communication subsystem 104 or with the short-range communications module 122. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, the short-range communications 122 and other device subsystems 124. The communication device may also be provided with an accelerometer 111, which may be used to detect gravity- or motion-induced forces and their direction. Detection of such forces applied to the device 100 may be processed to determine a response of the device 100, such as an orientation of a graphical user interface displayed on the display assembly 110 in response to a determination of the current orientation of which the device 100.

Some of the subsystems of the communication device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display 110, the rendering circuit 125 analyzes and processes the data file for visualization on the display 110. Rendering data files originally optimized or prepared for visualization on large-screen displays on a portable electronic device display often requires additional processing prior to visualization on the small-screen portable electronic device displays. This additional processing may be accomplished by the rendering engine 125. As will be appreciated by those of skill in the art, the rendering engine can be implemented in hardware, software, or a combination thereof, and can comprise a dedicated image processor and associated circuitry, or can be implemented within main processor 102.

The communication device 100 can send and receive communication signals over the wireless network 200 after required network registration or activation procedures have been completed. Network access is associated with a subscriber or user of the communication device 100. To identify a subscriber, the communication device 100 requires a SIM/RUIM card 126 (i.e. Subscriber Identity Module or a Removable User Identity Module) or another suitable identity module to be inserted into a SIM/RUIM interface 128 in order to communicate with a network. The SIM/RUIM card 126 is one type of a conventional "smart card" that can be used to identify a subscriber of the communication device 100 and to personalize the communication device 100, among other things. Without the SIM/RUIM card 126, the communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the communication device 100. Although current technology makes use of a battery, future technologies such as micro fuel cells can provide the power to the communication device 100.

The communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the communication device 100 during its manufacture. Other software applications include a message application 138 that can be any suitable software program that allows a user of the communication device 100 to send and receive electronic messages. Various alternatives exist for the message application 138 as is well known to those skilled in the art. Messages that have been sent or received by the user are typically stored in the flash memory 108 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system. Some or all of the data items stored at the communication device 100 may be indexed for searching on the device 100 either through a corresponding application, such as the PIM 142, or another suitable module. In addition, the items may be searchable using a unified search process implemented in the device operating system 134. For example, application data items can be encapsulated in a searchable entity class and registered with a unified search engine on the device 100 that executes searches against all registered data repositories on the device based on received queries. The search engine can also be configured to invoke a search process of external resources, such as Internet search engines or remote databases.

The communication device 100 also includes a connect module 144, and an information technology (IT) policy module 146. The connect module 144 implements the communication protocols that are required for the communication device 100 to communicate with the wireless infrastructure and any host system, such as an enterprise system, that the communication device 100 is authorized to interface with.

The connect module 144 includes a set of Application Programming Interfaces (APIs) that can be integrated with the communication device 100 to allow the communication device 100 to use any number of services associated with the enterprise system or with other systems accessible over the network 200. The connect module 144 allows the communication device 100 to establish an end-to-end secure, authenticated communication pipe with the host system. A subset of applications for which access is provided by the connect module 144 can be used to pass IT policy commands from the host system to the communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 200, the auxiliary I/O subsystem 112, the data port 114, the short-range communications subsystem 122, or any other suitable device subsystem 124. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 114 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 114 can be any suitable port that enables data communication between the communication device 100 and another computing device. The data port 114 can be a serial or a parallel port. In some instances, the data port 114 can be a USB port that includes data lines for data transfer and a supply line that can provide a charging current to charge the battery 130 of the communication device 100.

The short-range communications subsystem 122 provides for communication between the communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 may be an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the communication device 100 is substantially similar, except that the received signals are output to the speaker 118, and signals for transmission are generated by the microphone 120. Alternative voice or audio I/O subsystems, such as a voice message recording subsystem, can also be implemented on the communication device 100. Although voice or audio signal output is accomplished primarily through the speaker 118, the display 110 can also be used to provide additional information such as the identity of a calling party, duration of a voice call, or other voice call related information.

FIG. 2 shows an exemplary block diagram of the communication subsystem component 104. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the communication device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the communication device 100 and the wireless network 200 can contain one or more different channels, typically different RF channels, and associated protocols used between the communication device 100 and the wireless network 200. An RF channel is a limited resource that should be conserved, typically due to limits in overall bandwidth and limited battery power of the communication device 100. When the communication device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods. Other communication subsystems, such as the WLAN communication subsystem 105 shown in FIG. 1, may be provided with similar components as those described above configured for communication over the appropriate frequencies and using the appropriate protocols.

When operating the communication device 100, the user may wish to have e-mail messages retrieved for delivery to the communication device 100. The message application 138 operating on the communication device 100 can also request messages associated with the user's account accessible over a network.

Certain properties or restrictions associated with messages that are to be sent from and/or received by the communication device 100 can be defined. These may include whether the communication device 100 can receive encrypted and/or signed messages, minimum encryption key sizes, whether outgoing messages must be encrypted and/or signed, and whether copies of all secure messages sent from the communication device 100 are to be sent to a pre-defined copy address, for example.

The message management server 272 can also be adapted to provide other control functions, such as only pushing certain message information or pre-defined portions (e.g. "blocks") of a message stored on the message server 268 to the communication device 100. For example, in some cases, when a message is initially retrieved by the communication device 100 from the message server 268, the message management server 272 can push only the first part of a message to the communication device 100, with the part being of a pre-defined size (e.g. 2 KB). The user can then request that more of the message be delivered in similar-sized blocks by the message management server 272 to the communication device 100, possibly up to a maximum pre-defined message size. Accordingly, the message management server 272 facilitates better control over the type of data and the amount of data that is communicated to the communication device 100, and can help to minimize potential waste of bandwidth or other resources.

The mobile data server 274 encompasses any other server that stores information that is relevant to the corporation. The mobile data server 274 can include, but is not limited to, databases, online data document repositories, customer relationship management (CRM) systems, or enterprise resource planning (ERP) applications. The mobile data server 274 can also connect to the Internet or other public network, through HTTP server 275 or other suitable web server such as an File Transfer Protocol (FTP) server, to retrieve HTTP webpages and other data. Requests for webpages are typically routed through mobile data server 274 and then to HTTP server 275, through suitable firewalls and other protective mechanisms. The web server then retrieves the webpage over the Internet, and returns it to mobile data server 274. As described above in relation to message management server 272, mobile data server 274 is typically provided, or associated, with an encoder 277 that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the communication device 100 via the shared network infrastructure 224 and the wireless network 200. While encoder 277 is only shown for mobile data server 274, it will be appreciated that each of message server 268, message management server 272, and HTTP servers 275 and 279 can also have an encoder associated therewith.

The contact server 276 can provide information for a list of contacts for the user in a similar fashion as the address book on the communication device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the HTTP server 275, the contact server 276, the device manager module 278, the data store 284 and the IT policy server 286 do not need to be implemented on separate physical servers within the host system 250. For example, some or all of the functions associated with the message management server 272 can be integrated with the message server 268, or some other server in the host system 250. Alternatively, the host system 250 can comprise multiple message management servers 272, particularly in variant implementations where a large number of mobile devices need to be supported.

The device manager module 278 provides an IT administrator with a graphical user interface with which the IT administrator interacts to configure various settings for the communication devices 100. As mentioned, the IT administrator can use IT policy rules to define behaviors of certain applications on the communication device 100 that are permitted such as phone, web browser or Instant Messenger use. The IT policy rules can also be used to set specific values for configuration settings that an organization requires on the communication devices 100 such as auto signature text, WLAN/VoIP/VPN configuration, security requirements (e.g. encryption algorithms, password rules, etc.), specifying themes or applications that are allowed to run on the communication device 100, and the like.

Figure 3:
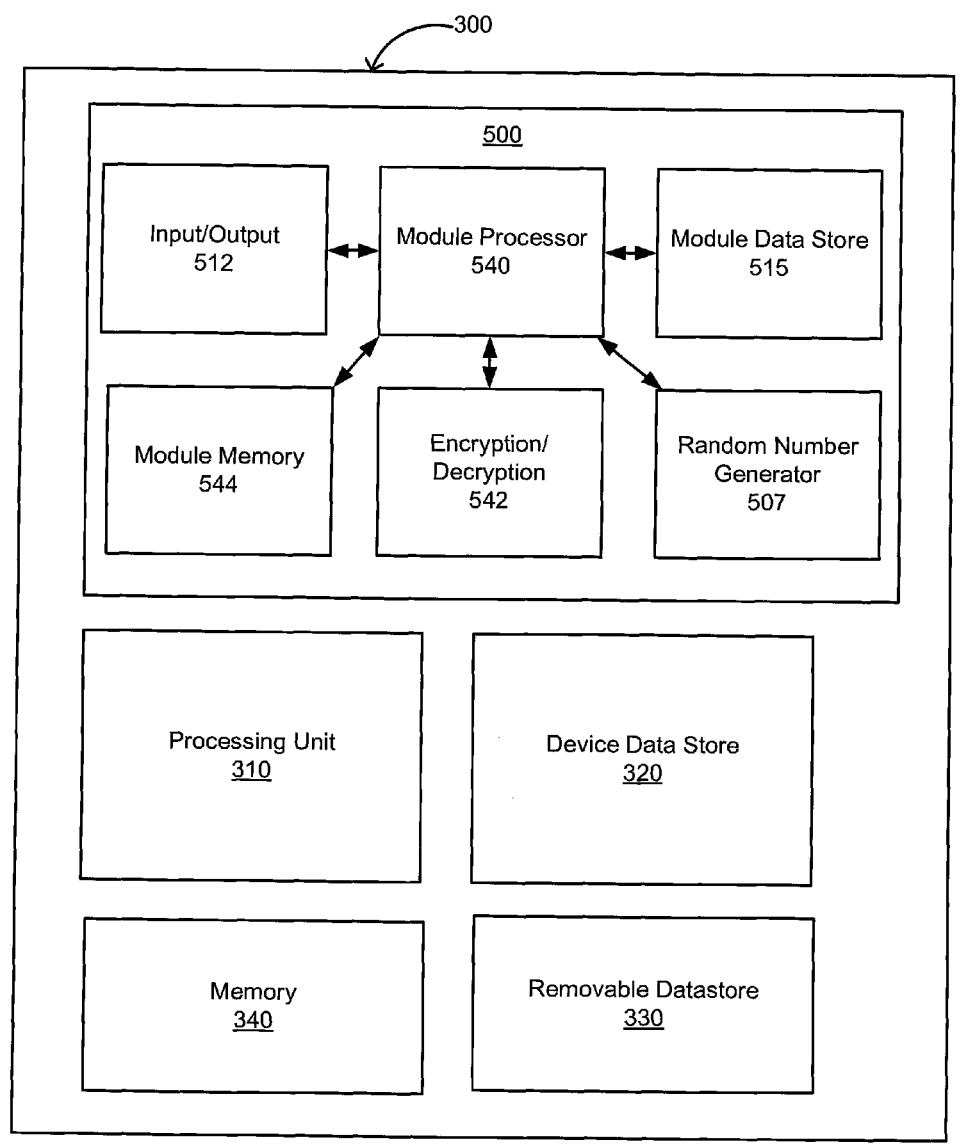
FIG. 3 is a block diagram of an exemplary computing device.

Referring to FIG. 3, in an embodiment a computing device 300 may utilise a hardware-based cryptographic module 500 to generate and maintain one or more cryptographic keys. The cryptographic module 500 is preferably located proximal to a processing unit 310 of the computing device 300. The computing device 300 may further comprise at least one device data store 320 for storing data on the computing device 300. Device data store 320 is preferably a persistent memory such as flash memory or a hard disc drive. In the embodiment of FIG. 3, computing device 300 further comprises a removable data store 330, such as a removable flash memory card as is known in the art.

Cryptographic module 500 provides an efficient means for securing data generated, received or stored by the computing device 300. Generally, a specialised cryptographic module 500 may provide a secure means for generating security information such as cryptographic keys. A special purpose, self-contained cryptographic module 500 may provide further security beyond software running on a central processing unit 310 of the computing device 300 that executes applications and software code of third parties using common memory 340. The cryptographic module 500 may communicate with other modules on the computing device 300 such as those illustrated for mobile communications device 100.

In the embodiment illustrated, cryptographic module 500 may comprise a module processor 540, module memory 544 (RAM), module data store 515, input/output components 512 and a source of randomness such as random number generator 507 to generate random data for use by other components of the cryptographic module. An example of a hardware component that could be used to generate random data is a ring oscillator. Alternatively, pseudorandom data could be generated using a pseudorandom number generator with a suitably large seed value, or hardware generated random data and pseudorandom data could be combined together to provide the source of randomness.

Cryptographic module 500 may comprise a single chip, such that the components described are actually functionality provided by the chip, as opposed to discrete physical items.

In the embodiment of FIG. 3, the cryptographic module 500 further comprises an encryption/decryption engine 542. The encryption/decryption engine 542 may be special purpose hardware for encrypting or decrypting data using a cryptographic key generated by the cryptographic module 500. In an alternate embodiment, the encryption/decryption engine 542 may comprise the module processor 540 operative to perform cryptographic operations including encryption and decryption using the cryptographic key when executing instructions stored in module data store 515.

In an embodiment, the cryptographic operations may comprise processing digital signatures and validation of such signatures, key agreement and other cryptographic operations which require cryptographic keys. In the embodiment, the cryptographic module 500 may be operative to receive content requiring, for instance, a digital signature or a validation of a digital signature. The cryptographic module 500 will be described below in the context of receiving plaintext for encryption or encrypted data for decryption, however it may be understood that content for signing or signed content for validation may be substituted for the plaintext or encrypted data for processing with the alternate cryptographic operation.

In an embodiment, the cryptographic module 500 may accept a password in the form of a string of characters, such as a binary string or a string of letters, numbers or symbols, and output a cryptographic key or perform a cryptographic operation responsive to the input password. In an aspect, upon receipt of the password the cryptographic module 500 may enter a cryptographic state and all cryptographic operations performed in the cryptographic state are responsive to the received password. Upon receipt of an updated password, the cryptographic module 500 may enter an updated cryptographic state responsive to the updated password.

In an aspect, the password may be received by the computing device 300 from a user through a user input interface. Alternatively, the password may be generated by the computing device 300 and stored in a device data store 320. In an aspect, the password may be secured for storage in the device data store 320, for instance by encrypting the password or storing the password within a secure data store. The generated password may be input to the cryptographic module 500 when the computing device 300 requires a cryptographic operation.

In embodiments where the password is input by a user, the passwords are typically shorter than is required for a cryptographic seed. Users also often choose passwords that are less secure by choosing common words or simple variants of known words. In an embodiment, a cryptographic key may be created that is identifiable and partly based on the input password, but not reliant on the password for complexity or randomness. In an embodiment, a cryptographic key may be created that is identifiable from the input password but not based on the input password.

In an embodiment, the cryptographic module 500 may be operative to receive data and encrypt or decrypt the received data. In the embodiment, the cryptographic module 500 may not communicate generated cryptographic keys to components outside the cryptographic module 500. In an embodiment, the cryptographic module 500 may be operative to enter a specific cryptographic state, e.g. either encryption or decryption using a specific cryptographic key, in which it processes received data. In an embodiment, the cryptographic module may be operative to enter a cryptographic state for generating keys in which it generates and outputs at least one cryptographic key upon receipt of a password.

Figure 4:
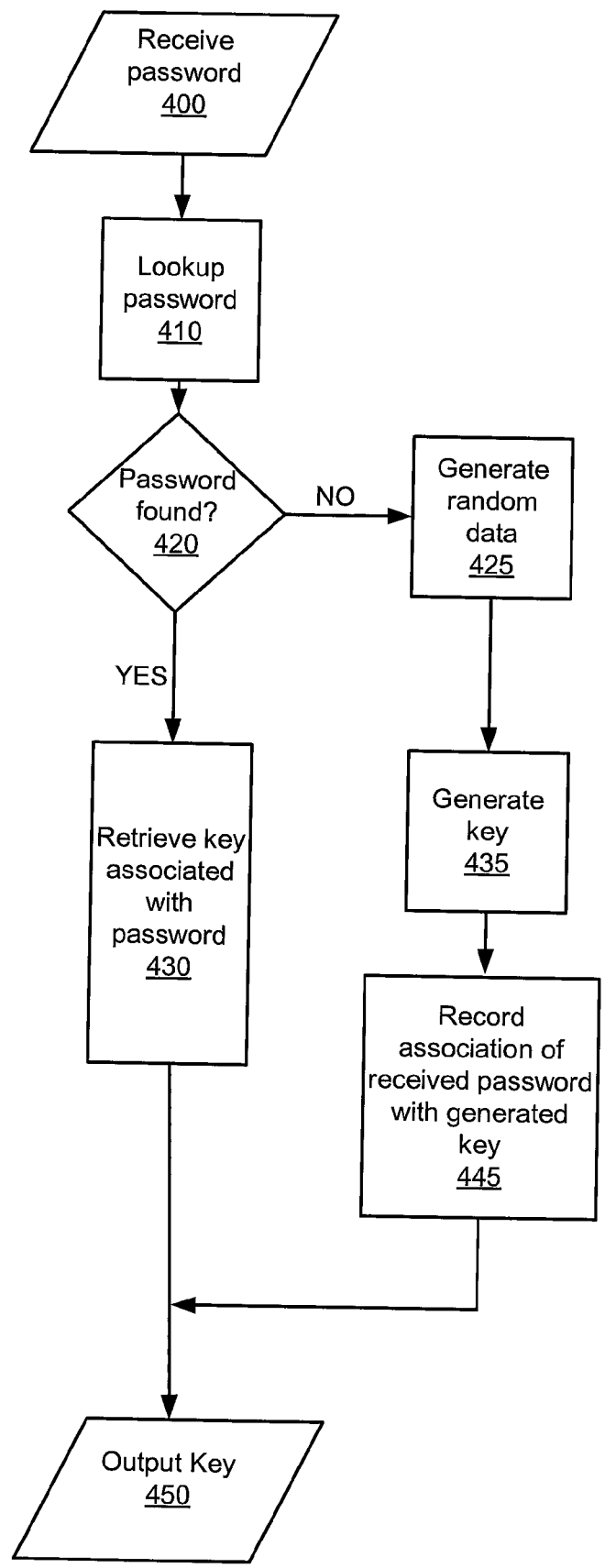
FIG. 4 is a flow chart of operations of an embodiment of the device.

With reference to FIG. 4, in an embodiment, the cryptographic module 500 may obtain or receive a password from a component operable in computing device 300, and in response to receipt of the password, generate and return one or more cryptographic keys. In the embodiment of FIG. 4, the cryptographic module 500 may output the generated one or more cryptographic keys to the component. In an aspect, the requesting component may specify whether an encryption key or a decryption key is required when submitting the password by submitting a cryptographic state identifier with the password to the cryptographic module.

The cryptographic module 500 receives the password, and optionally the cryptographic state identifier, through module input/output component 512 in step 400. In an aspect, receipt of the password may initiate a cryptographic state within the cryptographic module 500.

To determine if the password has been received before, the cryptographic module 500 may check a data store accessible to the cryptographic module 500 in step 410 and compare the received password with stored passwords contained in the data store. In an aspect, the data store may comprise module data store 515. In an aspect, the data store may comprise device data store 320 and the stored passwords may be stored in encrypted form and decrypted by the cryptographic module 500 using a private cryptographic key stored in the module data store 515. In an aspect, the stored password may be formed in an alternate form, such as a hash of the original password, and the comparison is made by the cryptographic module 500 converting the received password into the alternate form, such as processing the received password with a hash function to compare the hashed received password with the stored password.

The cryptographic module 500 determines whether the received password matches a stored password in step 420. If the received password is matched with a stored password, then the cryptographic module 500 has previously processed the input password to generate one or more cryptographic keys. Accordingly, the cryptographic module 500 retrieves the previously generated cryptographic keys associated with the received password from the data store (module data store 515 or device data store 320) in step 430.

If the received password does not match a stored password, then the cryptographic module 500 has yet to generate cryptographic keys for the received password. The cryptographic module 500 proceeds to generate random data in step 425, for instance using random number generator 507.

The cryptographic module 500 may then generate the one or more cryptographic keys using the generated random data in step 435. In an embodiment, the cryptographic module 500 may combine the generated random data with the received password to generate the one or more cryptographic keys. In an embodiment, the cryptographic module 500 may generate the one or more cryptographic keys using the generated random data without combination with the received password.

The cryptographic module 500 may then generate a record of the association of the received password with the generated key in step 445. In an embodiment, the cryptographic module 500 may record the received password, or an altered form such as a hash of the received password, in a look up table stored in a data store. The recorded password may point to the associated one or more cryptographic keys generated for that password. In an embodiment, the cryptographic module 500 may record the received password in association with the generated random data. In the latter embodiment, the cryptographic module 500 may be further operative to generate a required key in step 430 by retrieving the random data that is stored in association with the received key and generating the requested cryptographic key using the stored random data.

The one or more cryptographic keys, either retrieved or generated, may then be output from the cryptographic module 500 to the requesting component of the computing device 300 in step 450.

In an embodiment, the module processor 540 may be operative to combine the random data with the received password. In an alternate embodiment, the encryption/decryption component 542 may be used to combine the random data with the received password.

An example of a suitable combination process may be denoted as follows:

$$k = f(p, h)$$

where
    k is the cryptographic key
    p is the password (padded password)
    h is randomly generated data The function, f, is a function that produces unpredictable key, k, when supplied with p and h, at least one of which is unpredictable.

Since user entered passwords, and possibly component generated passwords, are typically shorter than the required input to a cryptographic key generation function, it may be desirable to extend the password until it is of sufficient length. The password may be extended, for example, by repeating the password until it is of sufficient length to combine with the randomly generated random data h. Alternatively, the password may be padded with a random string until it is of sufficient length to combine with the randomly generated data h. The padded password or the random string may be stored in association with the input password, to allow re-generation of the padded password if required.

One way of combining the password and randomly generated data is using the XOR binary operation, commonly referred to as a masking operation in cryptography. In this way a cryptographic key may be generated that is unique to, and partially dependent upon, the password as well as having the required attributes of the randomness. Other examples of suitable functions using as inputs the password and the random data include: a standardized key derivation function, or a deterministic combination of hash functions and block ciphers.

Another example of a way to determine the key is using an elliptical curve algorithm such as the Elliptic-Curve Diffie-Hellmann key agreement to derive $k = F(hP)$ where hP is the elliptic curve scalar multiplication in some elliptic curve of suitable size and F is some deterministic key-derivation function. P is an elliptic curve value derived from p, the password. F may possibly be the identity function. Any of these techniques, may be used in combination. For example, the Diffie-Hellmann algorithm with XOR may be represented as $k = F(hP) \text{ XOR } h$.

In an embodiment, the key derivation function may be the Ellipitic-Curve Diffie Hellmann key exchange using the 521-bit prime NIST curve and an ANSI key derivation function employing SHA-512 and the XOR combination. In this embodiment, the password is converted to an elliptic curve point P via the scalar multiplication $P = pG$ where G is the standardized generating point. An alternative method for determining P may be by decompressing the first valid point $(x, y) = (t_i(p), \bullet)$ for a sequence of x-coordinates $t_i(p)$ for $t_i$ being some sequence function. An example of $t_i$ is $t_i(p) = p + i$, $i = 0, 1, \ldots$. The elliptic curve point P may be calculated within the cryptographic module or the module may be presented with P as calculated in the device processing unit 310 from the password.

Upon initialization, the cryptographic module 500 may generate a strong random secret h using the random number generator 507, where for example, h is an elliptic curve private key. In this example, k, the encryption key, may be generated using the formula: $k = (F(hP) \text{ XOR } h) \bmod 2^{512}$, where F is the ANSI key-derivation function.

Once calculated from the received password and the randomly generated data, the key may be stored in a secure data store accessible to the cryptographic module 500, such as module data store 515, in association with the password. In this way the key may be retrieved at a later time when a password supplied to the cryptographic module 500 matches the previously submitted password stored in the secure data store.

The module data store 515 may have sufficient capacity to store a number of cryptographic keys each associated with the password used to generate that key or set of keys. When the module data store 515 has reached its capacity for cryptographic keys, the cryptographic module 500 may report an error to other components in the device 300; or may begin recording password-key associations in another secure data store, such as device data store 320 using a private encryption key as described above.

In an embodiment, the cryptographic module 500 may be operative to overwrite the passwords and cryptographic keys that have been stored the longest or the password-key that has not been accessed the longest, or use a similar algorithm to determine which key should be overwritten. In an aspect, the cryptographic module 500 may be operative to require a password if a particular cryptographic key is supplied or specified by the computing device 300 for use with a cryptographic operation. The cryptographic module 500 may further require a correct associated password to be presented in some limited number of trials, after which said particular cryptographic key will be deleted or otherwise rendered inoperative by the cryptographic module 500. This precaution reduces the likelihood that passwords can be guessed, for instance through a brute force attack using the computing device 300 to check the guesses.

Figure 5:
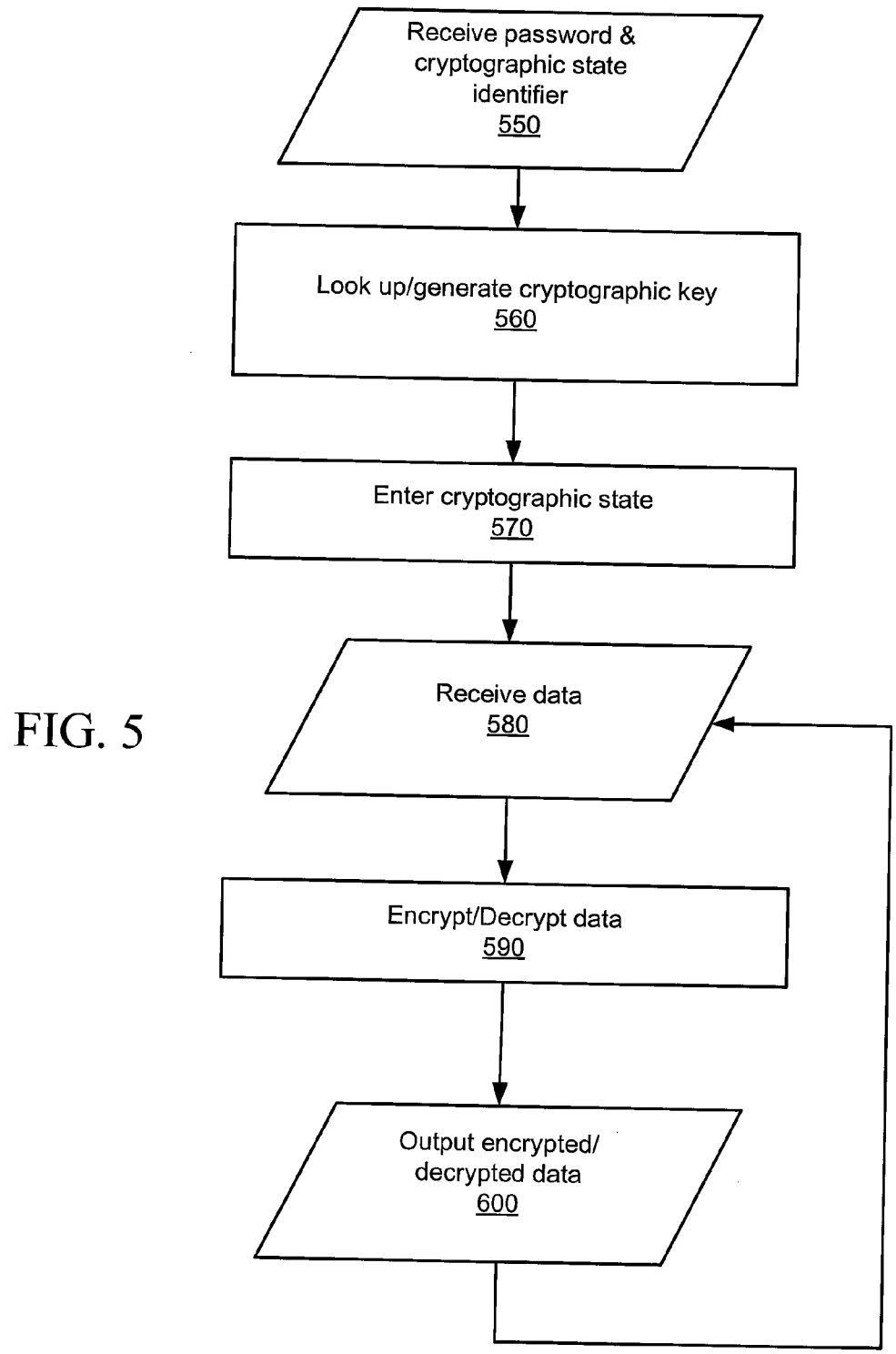
FIG. 5 is a flow chart of operations of an embodiment of the device.

Referring to FIG. 5, the cryptographic module 500 may be operative to receive data and encrypt or decrypt the received data. The cryptographic module 500 may receive a password and a cryptographic state identifier from a device requesting component in step 550. The cryptographic state identifier comprising a value that indicates whether the component requires encrypted data or decrypted data. The cryptographic module 500 may then look up or generate a cryptographic key corresponding to the received password and cryptographic state identifier in step 560. To generate the cryptographic key, the cryptographic module 500 may execute steps 400 to 440 outlined above, and instead of outputting the key in step 450, the cryptographic module 500 may retain the generated key for use during the encryption/decryption process. By not communicating the key outside the cryptographic module 500, the key may be more secure as it is typically difficult for an attacker to obtain information about operations or data stored within a module or chip.

The cryptographic module 500 may then enter a cryptographic state in step 570. The cryptographic state defined by the generated/retrieved cryptographic key and the cryptographic state identifier. For instance, the cryptographic state identifier may specify decryption in which case cryptographic state may comprise a decryption mode using the decryption key associated with the received password.

Upon entering the cryptographic state, the cryptographic module 500 may then be operative to receive data in step 530 and encrypt or decrypt the received data in step 540 using the cryptographic mode specified by the cryptographic state identifier and the cryptographic key associated with the received password.

The cryptographic module 500 may output the encrypted/decrypted data in step 550 and be operative to continue to receive, process and output data in the current cryptographic state until a new password/cryptographic state identifier is input to the cryptographic module 500 to initiate an updated cryptographic state.

Output processed data that has been encrypted or decrypted, depending on the cryptographic state of the cryptographic module 500, may be communicated to other components of the device 300. In an embodiment, the encryption and decryption may be done using a block cipher, such as AES with a suitable length key.

In the embodiment of FIG. 3, the cryptographic module 500 includes a hardware encryption/decryption component 542 for efficient encryption or decryption of data. In an alternate embodiment, the module processor 540 may be operative to perform the encryption/decryption operations, for instance by executing program code stored in the cryptographic module 500.

The cryptographic module 500 may also include a reset function that clears some or all of the encryption keys. For example, if a certain password has expired, it may be reset or cleared from the cryptographic module 500 freeing up space in the module data store 515 for additional passwords and keys. If the device 300 is lost or an attack is detected, the cryptographic module 500 may reset and some or all of the existing passwords and keys deleted from the data store 515.

In an aspect, the cryptographic module 500 may be operative to reset a specific set or subset of passwords, such as passwords used to encrypt sensitive data or email maintained on the device 300. In the aspect, the sensitive data is typically backed up on a server, such as a corporate mail server or a server within host system 250. The function of the cryptographic module 500 in this situation is to protect the remote copy of the sensitive data maintained on the device 300.

The cryptographic module 500 may be operative to reset upon receipt of a trigger or kill command sent by the device 300. The device 300 may be operative to receive the trigger or kill command from a server, such as a server within host system 250. In this way, even if an attacker successfully obtains a password, it will be difficult for the attacker to access the encrypted data as the cryptographic module 500 will no longer be operative to decrypt the data.

In one embodiment, if an incorrect password is received repeatedly by the device 300, the device 300 may be operative to send the trigger or kill command to the cryptographic module 500. In an aspect, the cryptographic module 500 may be operative to reset when it receives one or more passwords that are not recorded in the data store along with a decryption cryptographic state identifier. The combination of a decryption state identifier and a non-recorded password may indicate an attempt to find the correct password using a 'brute force' attack by repeatedly guessing at possible passwords. In an aspect, the cryptographic module 500 may be operative to reset when it receives one or more passwords that are not recorded in the data store along with a request to verify data such as a digital signature. The combination of a non-recorded password along with a request to verify data may similarly indicate a 'brute force' attack where the attacker feeds guessed passwords until the data is verified.

Since the cryptographic keys are stored securely, either within the cryptographic module 500 or on the device data store 320 in encrypted form using private keys, and are obtained, in part, using random data generated within the cryptographic module 500, data encrypted using one instance of the cryptographic module 500 can not be decrypted by a different instance of the cryptographic module 500.

For example, if a smart card is inserted into a first device 300 and the cryptographic module 500 of the first device 300 is used to generate an encryption key and encrypt data written to the smart card, the encrypted data on the smart card can not be decrypted if the smart card is inserted into a second device 300, even if the second device 300 also includes a cryptographic module 500 and the same password is input to the cryptographic module 500 of the second device 300. This is because the random number generator 507 of each cryptographic module 500 will most likely generate a different random number string for each instance of generating a cryptographic key, even though the same password may be used.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

We claim:

1. A computing device implemented method for using a cryptographic module located within the computing device, the method comprising:
   a processor of the cryptographic module:
   receiving a password together with a cryptographic state identifier, the cryptographic state identifier specifying either an encryption mode or a decryption mode for the cryptographic module;
checking a data store for a cryptographic key previously recorded in association with the received password;
when the data store contains a cryptographic key previously recorded in association with the received password,
retrieving said cryptographic key; and
entering the encryption mode or the decryption mode as specified by the received cryptographic state identifier, and while in said mode, receiving data to be processed from a component of the computing device, processing said received data in accordance with said mode using said retrieved cryptographic key, and outputting the processed data; and
when the data store does not contain a cryptographic key previously recorded in association with the password,
generating a random number using a random number generator;
generating at least one cryptographic key using the generated random number; and,
recording an association of the received password and the at least one cryptographic key in the data store.

2. The method of claim 1 wherein the generating at least one cryptographic key further comprises the processor combining the generated random number with the received password as inputs to a cryptographic key generation operation to form the at least one cryptographic key.

3. The method of claim 1 wherein after generating the at least one cryptographic key, the method further comprises the processor outputting the at least one cryptographic key to a component of the computing device.

4. The method of claim 1, further comprising, after the cryptographic module generates the at least one cryptographic key:
the processor:
entering the encryption mode or the decryption mode as specified by the received cryptographic state identifier, and while in said mode, receiving data to be processed from the component of the computing device, processing said received data in accordance with said mode using said generated at least one cryptographic key, and outputting the processed data.

5. The method of claim 1 wherein the cryptographic module is further operative to receive a kill command from the computing device and, in response to the kill command, the method further comprises the processor deleting the recorded association from the data store.

6. The method of claim 1, further comprising, prior to checking the data store:
determining whether the received password is correct; and
when the received password is not correct, the cryptographic module deleting at least one previously recorded association from the data store.

7. The method of claim 2 wherein the at least one cryptographic key is generated by combining the generated random number with the received password using an XOR operation.

8. The method of claim 2 wherein the at least one cryptographic key is generated by the processor:
deriving an elliptic curve value from the received password;
performing an elliptic curve scalar multiplication using the elliptic curve value and the generated random number; and,
applying a deterministic key-derivation function to the product of the elliptic curve scalar multiplication.

9. The method of claim 8 further comprising the processor combining the result of the deterministic key-derivation function with the generated random number using an XOR operation.

10. A cryptographic module for a computing device, the cryptographic module comprising:
an input for receiving a password together with a cryptographic state identifier, the cryptographic state identifier specifying either an encryption mode or a decryption mode for the cryptographic module;
an output for outputting data to the computing device;
a random number generator for generating a random number;
a module processor operative to:
receive the password together with the cryptographic state identifier;
check a data store for a cryptographic key previously recorded in association with the received password;
when the data store contains a cryptographic key previously recorded in association with the received password,
retrieve said cryptographic key; and
enter the encryption mode or the decryption mode as specified by the received cryptographic state identifier, and while in said mode, receive data to be processed from a component of the computing device, process said received data in accordance with said mode using said retrieved cryptographic key, and output the processed data; and
when the data store does not contain a cryptographic key recorded in association with the password,
generate a random number using the random number generator;
generate at least one cryptographic key using the generated random number; and
record an association between the received password and the at least one cryptographic key in the data store.

11. The cryptographic module of claim 10 wherein the cryptographic module is further operative to generate the at least one cryptographic key by combining the generated random number with the received password as inputs to a cryptographic key generation operation to form the at least one cryptographic key.

12. The cryptographic module of claim 10 wherein the cryptographic module is further operative to output the at least one cryptographic key to the computing device.

13. The cryptographic module of claim 10 wherein the cryptographic module is further operative to:
enter the encryption mode or decryption mode as specified by the received cryptographic state identifier, and while in said mode,
receive data to be processed from the component of the computing device;
process the received data in accordance with said mode using said generated at least one cryptographic key; and,
output the processed data.

14. The cryptographic module of claim 10 wherein the cryptographic module is further operative to receive a kill command from the computing device and, in response to the kill command, delete the recorded association from the data store.

15. The cryptographic module of claim 13 wherein the cryptographic module is further operative to:
determine whether the received password is correct; and
when the received password is not correct, delete at least one previously recorded association from the data store.

16. The cryptographic module of claim 11 wherein the cryptographic module is operative to generate the at least one cryptographic key by combining the generated random number with the received password using an XOR operation.

17. The cryptographic module of claim 11 wherein the cryptographic module is operative to generate the at least one cryptographic key by the cryptographic module:
- deriving an elliptic curve value from the received password;
- performing an elliptic curve scalar multiplication using the elliptic curve value and the generated random number; and,
- applying a deterministic key-derivation function to the product of the elliptic curve scalar multiplication.

18. The cryptographic module of claim 17 wherein the cryptographic module is operative to generate the at least one cryptographic key by combining the result of the deterministic key-derivation function with the generated random number using an XOR operation.

19. A non-transitory computer readable storage media bearing computer readable instructions which when implemented in a processor of a cryptographic module cause the module to implement the steps of the method of claim 1.

* * * * *